(12) United States Patent
Wei

(10) Patent No.: US 8,688,135 B2
(45) Date of Patent: Apr. 1, 2014

(54) METHOD AND BASE STATION FOR IMPLEMENTING CARRIER AGGREGATION

(75) Inventor: Wei Wei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 325 days.

(21) Appl. No.: 13/257,602

(22) PCT Filed: Aug. 24, 2009

(86) PCT No.: PCT/CN2009/073472
§ 371 (c)(1),
(2), (4) Date: Sep. 20, 2011

(87) PCT Pub. No.: WO2010/108348
PCT Pub. Date: Sep. 30, 2010

(65) Prior Publication Data
US 2012/0009935 A1   Jan. 12, 2012

(30) Foreign Application Priority Data
Mar. 27, 2009   (CN) .......................... 2009 1 0132616

(51) Int. Cl.
*H04W 72/00*   (2009.01)
(52) U.S. Cl.
USPC ........... 455/450; 455/464; 455/509; 370/329; 370/330; 370/331; 370/335; 370/431
(58) Field of Classification Search
USPC .......... 370/329–331, 335, 431; 455/450, 464, 455/509
See application file for complete search history.

(56) References Cited

U.S. PATENT DOCUMENTS

| 8,091,088 B2 * | 1/2012 | Kishan et al. .................. 718/104 |
| 2004/0160922 A1 * | 8/2004 | Nanda et al. .................. 370/335 |
| 2005/0026624 A1 * | 2/2005 | Gandhi et al. ................ 455/453 |
| 2006/0259906 A1 * | 11/2006 | Czajkowski et al. ......... 718/104 |
| 2007/0070878 A1 | 3/2007 | Norin |

(Continued)

FOREIGN PATENT DOCUMENTS

| CN | 10164865 A | 10/2007 |
| CN | 101098294 A | 1/2008 |
| WO | 2007092517 A2 | 8/2007 |
| WO | 2008085009 A1 | 7/2008 |

OTHER PUBLICATIONS

International Search Report in international application No. PCT/CN2009/073472, mailed on Dec. 31, 2009.

(Continued)

*Primary Examiner* — Liton Miah
(74) *Attorney, Agent, or Firm* — Oppedahl Patent Law Firm LLC

(57) ABSTRACT

The present invention discloses a method and base station for implementing a carrier aggregation. The method comprises: a base station determines predetermined information, wherein the predetermined information comprises reserved resources for the carrier aggregation and the capability of a user terminal; the base station selects a first carrier resource from the reserved resources according to the capability of the user terminal and selects, for the user terminal, a second carrier resource for bearing data from the resources except the reserved resources; and the base station aggregates the first and second carrier resources. On the premise of reducing the inter-cell interference, the present invention can increase the number of the carriers used by the user terminal to meet the various requirements of a new wireless communication network and guarantee the communication quality of the wireless communication network.

19 Claims, 3 Drawing Sheets

(56) References Cited

U.S. PATENT DOCUMENTS

| | | | |
|---|---|---|---|
| 2007/0168482 A1 | 7/2007 | Chen et al. | |
| 2009/0274165 A1* | 11/2009 | Csaszar et al. | 370/443 |
| 2009/0323712 A1* | 12/2009 | Bodin et al. | 370/431 |
| 2011/0134877 A1* | 6/2011 | Noh et al. | 370/329 |
| 2012/0002568 A1* | 1/2012 | Tiirola et al. | 370/252 |

OTHER PUBLICATIONS

English Translation of the Written Opinion of the International Search Authority in international application No. PCT/CN2009/073472, mailed on Dec. 31, 2009.
Technical Specification Group Radio Access Network Feb. 2009.
Notion of Anchor Carrier in LTE-A Jan. 12-16, 2009.
Alcatel-Lucent Shanghai Bell et al: "Support of wider bandwidth for Home eNodeB in LTE-Advanced". 3GPP Draft; R1-090769 Support of Wider Bandwidth for Home ENB, 3rd Generation Partnership Project (3GPP), Mobile Competence Centre; 650, Route Des Lucioles ; F-06921 Sophia-Antipolis Cedex ; France, vol. RAN WG1, no. Athens, Greece; Feb. 9, 2009-Feb. 13, 2009, Feb. 3, 2009, (7 pages).
CMCC: "Discussions on:Carrier Aggregation in RAN2", 3GPP Draft; R2-092411 Discussions on Carrier Aggregation in RAN2, 3rd Generation Partnership Project (3GPP), Mobile Competence Centre; 650, Route Des Lucioles ; F-06921 Sophia-Antipolis Cedex ; France, no. Seoul, Korea; Mar. 17, 2009, (4 pages).
Qualcomm Europe: "Carrier Aggregation in Heterogeneous Networks", 3GPP Draft; R1-091459, 3rd Generation Partnership Project (3GPP), Mobile Competence Centre; 650, Route Des Lucioles ; F-06921 Sophia-Antipolis Cedex ; France, no. Seoul, Korea; Mar. 18, 2009, (14 pages).
Huawei: "Automatic selection of component carrier for carrier aggregation", 3GPP Draft; R3-090812 The Automatic Selection of Component Carriers for Carrier Aggregation, 3rd Generation Partnership Project (3GPP). Mobile Competence Centre; 650, Route Des Lucioles ; F-06921 Sophia-Antipolis Cedex ; France, No. Seoul, Korea; Mar. 18, 2009, (2 pages).
Supplementary European Search Report in European application No. 09842082.1, mailed on Sep. 30, 2013. (7 pages).

* cited by examiner

METHOD AND BASE STATION FOR IMPLEMENTING CARRIER AGGREGATION

TECHNICAL FIELD

The present invention relates to the field of communications, and in particular, to a method and base station for implementing a carrier aggregation.

BACKGROUND

In a next generation bandwidth wireless communication network, how to support more bandwidth under the current bandwidth of the wireless communication system has become a key factor for increasing the throughput capacity and the average throughput capacity of an inter-cell User Terminal (UT for short) in a wireless communication system.

At present, a carrier aggregation has been proposed to be used in a Long Term Evolution (LTE for short) system of the third generation partnership project to effectively support more bandwidth in the current wireless communication system, thereby meeting the requirements of the new generation wireless standards on the indexes such as throughput capacity and peak rate. The carrier aggregation is a key technology for supporting more bandwidth in the future wireless communication systems, which can aggregates different carriers to produce a carrier with more bandwidth to support a more powerful UT on a aggregated bandwidth, for example, to support a bandwidth of above 100 MHz in a Long-Term Evolution Advanced (LTE-Advanced for short) system.

However, the carrier aggregation discussed in the current LTE-Advanced takes no consideration of the influence of an inter-cell interference, which plays an important role on the inter-cell UT throughput capacity and the UT average throughput capacity, if part of the aggregated carrier suffer a severe inter-cell interference, then even if more bandwidth is obtained, the throughput capacity and the speed of the UT using the part of aggregated carrier are lowered because of severe inter-cell interference, and the benefits of the carrier aggregation are consequentially undermined.

No effective solution has been proposed so far to address the problem that in prior art, and the throughput capacity and the speed of a UT are reduced as the influence of an inter-cell interference on the throughput capacity and the average throughput capacity of the UT is not taken into consideration in a carrier aggregation.

SUMMARY

In view of the problem existing in prior art that the throughput capacity and the speed of a UT are lowered as the influence of an inter-cell interference on the throughput capacity and the average throughput capacity of the UT is not taken into consideration in a carrier aggregation, the present invention has been proposed and is mainly aimed to provide a solution for implementing a carrier aggregation to address the problem above.

In order to achieve the purpose above, according to an aspect of the present invention, a method for implementing a carrier aggregation is provided.

In accordance with the present invention, the method for implementing a carrier aggregation comprises: determining predetermined information by a base station, wherein the predetermined information comprises reserved resources for the carrier aggregation and the capability of a user terminal; selecting a first carrier resource by the base station from the reserved resources according to the capability of the user terminal and selecting, for the user terminal, a second carrier resource for bearing data by the base station from the resources except the reserved resources; and aggregating the first and second carrier resources by the base station.

Wherein the step that aggregating the first and second carrier resources by the base station may comprise: the base station receives a measurement result reported by the user terminal, wherein the measurement result is the result of a measurement of the user terminal on the interference of the first and second carrier resources selected by the base station; and the base station determines, according to the measurement result, whether the interference of the user terminal meets the conditions for an inter-cell interference coordination in the system, and if the interference of the user terminal meets the conditions for an inter-cell interference coordination in the system, the base station aggregates the first and second carrier resources;

preferably, the step that the base station determines, according to the measurement result, whether the interference of the user terminal meets the conditions for an inter-cell interference coordination in the system may further comprise: if the result of the determination is that the interference of the user terminal fails to meet the conditions for an inter-cell interference coordination in the system, the base station takes the second carrier resource and the reserved resources as new reserved resources and reselects a first carrier resource from the new reserved resources.

Preferably, the predetermined information determined by the base station may further comprise: the dimensions of the carriers participating in the carrier aggregation, and the dimensions are determined by the base station according to the bandwidth types supported by all the user terminal.

Preferably, the base station may determine the reserved resources according to at least one of the factors: the load condition of the current system, the capability of the user terminal and/or the change thereof, the bandwidth types supported by all the user terminal, and the condition of the inter-cell interference.

Preferably, in neighboring cells, all the reserved resources determined by the base station for the carrier aggregation may be orthogonal resources.

Preferably, the capability of the user terminal determined by the base station may comprise: the bandwidth capability of the user terminal, the number of the aggregation-affecting carriers and the dimensions of the aggregation-affecting carriers.

Preferably, after the base station aggregates the carrier resources and the other carrier resources, the method may further comprise: the base station reselects a first carrier resource when the interference caused by the use of a new carrier resulting from the aggregation by the user terminal fails to meet the conditions.

Preferably, the first carrier resource may be used for bearing the control signaling and the physical process of the user terminal.

In order to achieve the purpose above, according to another aspect of the present invention, there is provided a base station.

In accordance with the present invention, the base station comprises: a determination module for determining predetermined information, wherein the predetermined information comprises reserved resources for a carrier aggregation and the capability of a user terminal; a first selection module for selecting a first carrier resource from the reserved resources according to the capability of the user terminal; a second selection module for selecting, for the user terminal, a second carrier resource for bearing data from the resources except the reserved resources; and an aggregation module for aggregating the first carrier resource selected by the first selection module and the second carrier resource selected by the second selection module.

Wherein the aggregation module may comprise: a reception sub-module for receiving a measurement result reported by the user terminal, wherein the measurement result is the result of a measurement of the user terminal on the interference of the first and second carrier resources selected by the base station; a determination sub-module for determining, according to the measurement result received by the reception sub-module, whether the interference of the user terminal meets the conditions for an inter-cell interference coordination in the system; and an aggregation sub-module for aggregating the first and second carrier resources when the determination sub-module determines that the interference of the user terminal meets the conditions for an inter-cell interference coordination in the system.

By implementing a carrier aggregation based on resource reservation and reserving the important control channels born in the carrier aggregation and the carriers playing a big part in an important physical process such as random access, the present invention addresses the problem existing in prior art that the throughput capacity and the speed of a UT are lowered as the influence of an inter-cell interference on the throughput capacity and the average throughput capacity of the UT is not taken into consideration in a carrier aggregation, therefore, the present invention can consequentially increase, on the premise of reducing the inter-cell interference, the number of the carriers used by the user terminal to meet the various requirements of a new wireless communication network and guarantee the communication quality of the wireless communication network.

BRIEF DESCRIPTION OF THE DRAWINGS

The accompanying drawings illustrated herein are provided for a better understanding of the present invention and form one part of this disclosure, and the exemplary embodiments of the present invention and the description thereof are for explaining the invention but not limiting the invention. In the accompanying drawings.

DETAILED DESCRIPTION

Function Overview

In view of the problem existing in prior art that the throughput capacity and the speed of a UT are lowered as the influence of an inter-cell interference on the throughput capacity and the average throughput capacity of the UT is not taken into consideration in a carrier aggregation, a solution for implementing a carrier aggregation is provided in an embodiment of the present invention which, by implementing a carrier aggregation based on resource reservation and reserving the important control channels born in the carrier aggregation as well as the parts of carriers playing a big part in an important physical process such as random access, can increase, on the premise of reducing the inter-cell interference, the number of the carriers used by the UT to meet the various requirements of a new wireless communication network and guarantee the communication quality of the wireless communication network.

It should be noted that the embodiments of the present invention and the features thereof can be combined with each other if no conflict is caused. The invention is described below in detail by reference to the accompanying drawings in conjunction with exemplary embodiments.

Method Embodiments

In accordance with an embodiment of the present invention, a method for implementing a carrier aggregation is provided.

Figure 1:
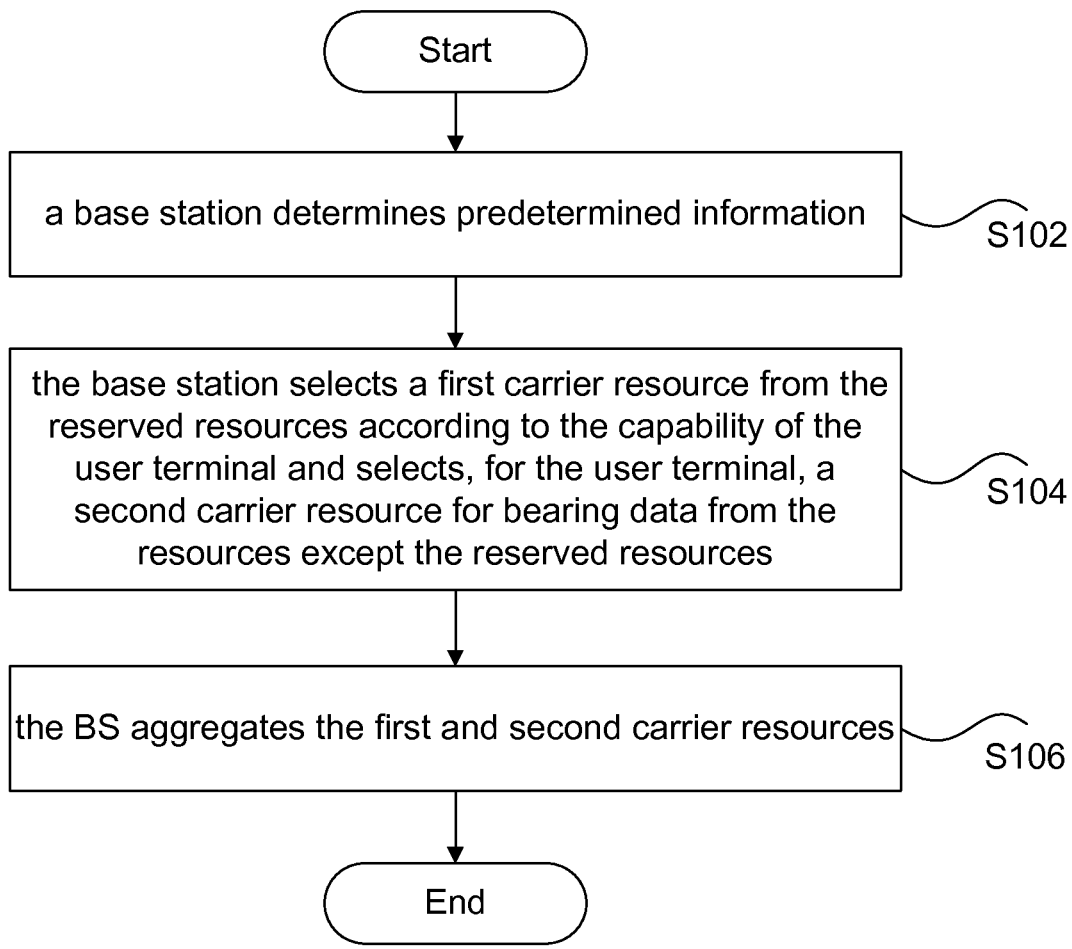
FIG. 1 is a flow chart illustrating a method for implementing a carrier aggregation according to an embodiment of the present invention.

FIG. 1 is a flow chart illustrating the method for implementing a carrier aggregation according to an embodiment of the present invention, as show in FIG. 1, the method comprises the following steps S102-S106:

S102: a Base Station (BS for short) determines predetermined information, wherein the predetermined information may comprise: reserved resources for the carrier aggregation, the capability of a user terminal; and preferably, the predetermined information may further comprise the dimensions of the carriers participating in the carrier aggregation;

S104: the BS selects a first carrier resource from the reserved resources according to the capability of the user terminal and selects, for the user terminal, a second carrier resource for bearing data from the resources except the reserved resources, wherein the first carrier resource is used for bearing the control signaling and the physical process of the user terminal; and S106: the BS aggregates the first and second carrier resources, and specifically, this step comprises the following operations:

(1) the BS receives a measurement result reported by the user terminal, wherein the measurement result is the result of a measurement of the user terminal on the interference of the first and second carrier resources selected by the BS; and (2) the BS determines whether the interference of the user terminal meets the conditions for an inter-cell interference coordination in the system according to the result of the measurement and, if so, aggregates the first and second carrier resources, otherwise, takes the second carrier resource and the reserved resources as new reserved resources and reselects a first carrier resource from the new reserved resources.

This embodiment can address the problem existing in prior art that the throughput capacity and the speed of a UT are lowered as the influence of an inter-cell interference on the throughput capacity and the average throughput capacity of the UT is not taken into consideration in a carrier aggregation, and can consequentially increase, on the premise of reducing the inter-cell interference, the number of the carriers used by the UT to meet the various requirements of a new wireless communication network and guarantee the communication quality of the wireless communication network.

It should be noted that the BS will reselect a first carrier resource if the interference caused by the use of a new carrier resulting from the aggregation by the user terminal fails to meet the conditions.

The invention is described below in detail with reference to accompanying drawings in combination with embodiments. It should be appreciated that the steps shown in the accompanying flow chart can be executed in, for example, a computer system consisting of a group of instruction-executable computers, moreover, although a logic order is shown in the flow chart, the shown or described steps can be executed in a different order in some cases.

Figure 2:
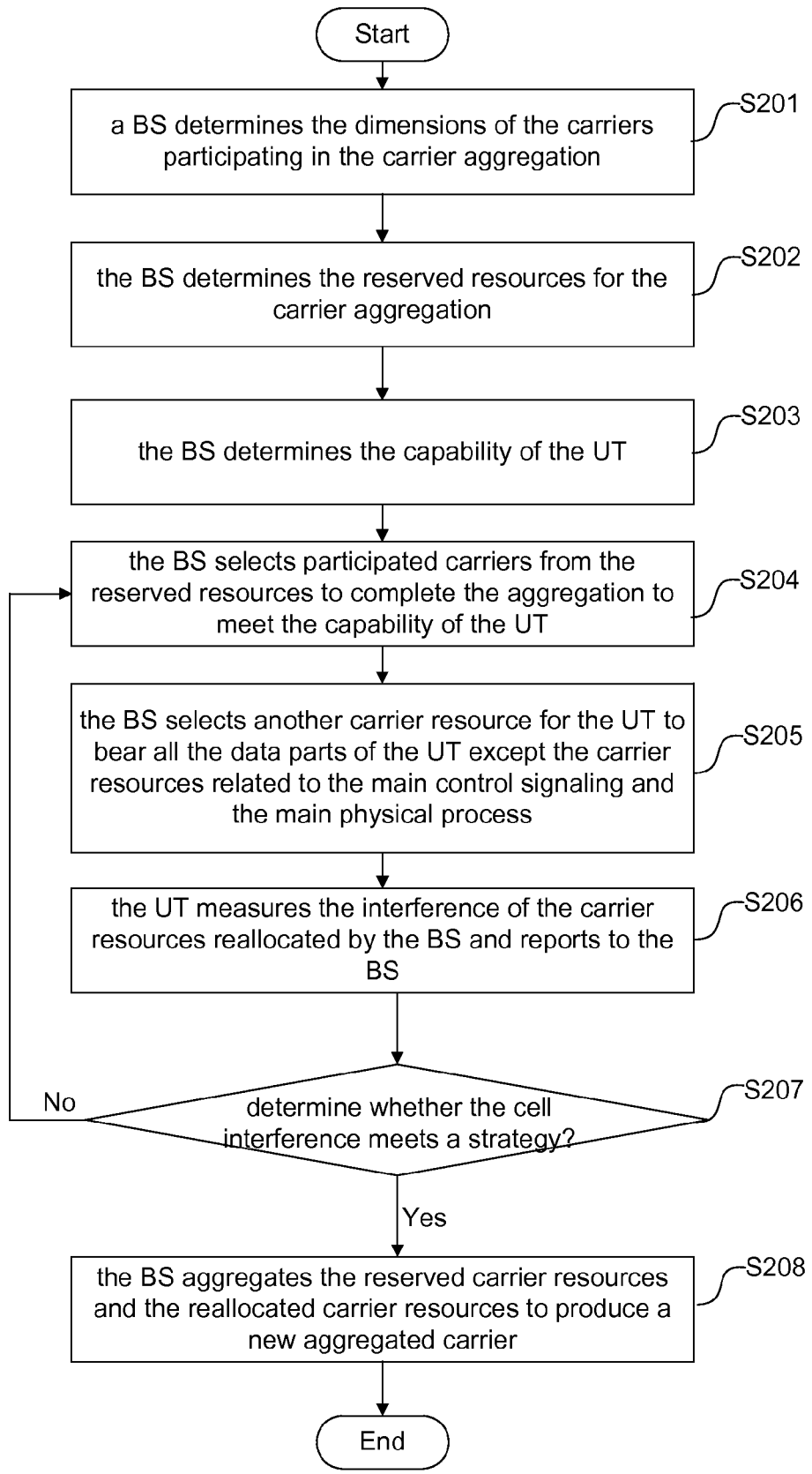
FIG. 2 is a detailed flow chart illustrating a method for implementing a carrier aggregation according to an embodiment of the present invention.

FIG. 2 is a detailed flow chart illustrating a method for implementing a carrier aggregation according to an embodiment of the present invention, as show in FIG. 2, the method comprises the following steps S201-S208:

S201: a BS determines the dimensions of the carrier parts participating in the carrier aggregation according to the bandwidth types supported by all the user terminals (that is, the above-described step S102).

Wherein in the step that the BS determines the dimensions of the carrier parts participating in the carrier aggregation, as a new system is necessarily and rigidly required to be backward compatible with the original system, there may be a UT of the original system in the new system. However, the UT bearable in the new system and that bearable in the original system have significantly different requirements on bandwidth, for instance, there may be bandwidths of 10 MHz and 20 MHz in an LTE system while there may exist a bandwidth of 100 MHz in an LTE-Advanced, as a result, the BS is definitely required to organize all the supported bandwidth types so that the carrier aggregation can support the bandwidths of all the types.

S202: the BS determines the reserved resources for the carrier aggregation (that is, the above-described S102), wherein the BS determines the reserved resources according to (not in a limited way) at least one of these factors: the load condition of the current system, the capability of the user terminal and/or the change thereof, the bandwidth types supported by all the user terminal, and the inter-cell interference condition.

Specifically, when determining the reserved resources for the carrier aggregation, the BS reserves carrier resources suitable for the system condition according to the load condition of the current system, the capability of the UT and all the supported bandwidth types and the like, the resource reservation described in this embodiment is only explained as an example, it should be understood that other factors may be taken into consideration during a resource reservation and such a resource reservation belongs to the protection scope of the present invention.

The reserved resources for the carrier aggregation can be reallocated, increased or decreased according to the conditions of the system such as the load condition, the change of the capability of the UT and the inter-cell interference so as to improve the utilization rate of the resources.

The inter-cell interference is taken into consideration during the resource reservation for the carrier aggregation, and in neighboring cells, all the reserved resources determined by the BS for the carrier aggregation are orthogonal resources.

S203: the BS determines the capability of the UT, which comprises the bandwidth capability of the user terminal, the number of the aggregation-affecting carriers and the dimensions of the aggregation-affecting carriers (that is, the above-described S102).

S204: the BS selects the participated carriers (that is, the aforementioned first carrier resource) from the reserved resources to complete the aggregation to meet the capability of the UT, wherein the BS aggregates the selected carrier resources to produce a new bigger carrier for providing services for the UT (that is, the above-described S104).

S205: the BS selects another carrier resource (that is, the aforementioned second carrier resource) for the UT to bear all the data parts except the carrier resources related to the main control signaling and the main physical process (that is, the above-described S104).

It should be noted that the resources reserved for the carrier aggregation are limited in the system, if too many resources are reserved, the utilization rate of the carrier resources will be dramatically influenced. In order to play a greater role of the reserved resources, all the data parts except the carrier resources related to the main control signaling and the main physical process are allocated to other carrier resources on the premise of not lowering the quality of the services of the UT, thus, because the resources used by the main control signaling or during the main physical process are still located on the reserved carrier resources; meanwhile, as the carrier resources reserved for an aggregation of the carriers from neighboring cells are orthogonal, under the condition that the inter-cell interference is effectively reduced, the times of the blind detection of the UT during various physical processes, and the time taken on a signaling interaction as well as the energy consumption of the UT are reduced additionally.

S206: the UT measures the interference of the carrier resources reallocated by the BS and reports to the BS.

S207: after receiving the interference of the reallocated carrier resources that reported by UT, the BS determines whether the interference caused by the use of the carrier resources by the UT meets the conditions for an inter-cell interference coordination in the system, that is, determines whether the cell interference meets an inter-cell interference strategy in the system, if so, proceeds to S208, otherwise, returns to S204.

In steps S206 and S207 where the inter-cell interference is taken into consideration, if the inter-cell interference strategy in the current system cannot be met when the UT sends/receives data on the newly allocated carrier resources, then the BS still temporarily puts the carrier resources occupied by the data part of the UT in the reserved resources part, and sequentially seeks for a new carrier resource meeting the inter-cell interference for the UT according to the inter-cell interference strategy. In this way, the carrier resources reserved for the carrier aggregation are guaranteed to be used completely under the condition that the UT has a comparatively small inter-cell interference.

And S208: the BS aggregates the carrier resources in the reserved resources for bearing the control signaling and the main physical process of the UT and the reallocated carrier resources for bearing data, so as to produce a new aggregated carrier. That is, the BS aggregates the carrier resources that are ultimately determined for the UT to produce a new carrier resource meeting the capability of the UT (that is, the above-described S106).

It should be noted that in the carrier aggregation of this embodiment of the present invention based on resource reservation, if the UT regenerates, by using the new carrier resulting from the aggregation, a strategy that fails to meet the inter-cell interference of the current system along with the change in the conditions of the UT, such as the movement of the UT and the change in the capability of the UT, then the method provided in this embodiment of the present invention based on resource reservation can still be used to reselect a new resource. The above-described carrier aggregation method based on resource reservation is an applicable, simple and easy-to-use method that takes the inter-cell interference into consideration.

Apparatus Embodiments

In accordance with this embodiment of the present invention, a BS for carrying out the above mentioned method for implementing a carrier aggregation is provided.

Figure 3:
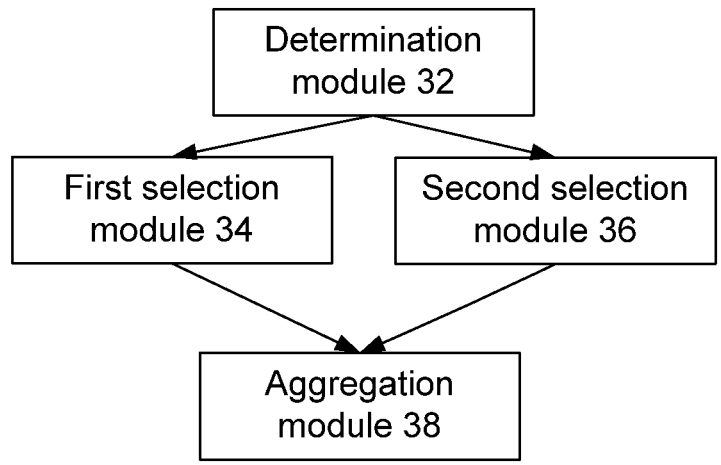
FIG. 3 is the structure diagram illustrating a base station according to an embodiment of the present invention.

FIG. 3 is a structure diagram illustrating the BS according to this embodiment, as shown in FIG. 3, the BS comprises a determination module 32, a first selection module 34, a second selection module 36 and an aggregation module 38, each of which is described below:

the determination module 32 is used for determining predetermined information, wherein the predetermined information comprises reserved resources for the carrier aggregation and the capability of a UT; and the determination module 32 is further used for determining the dimensions of the carriers participating in the carrier aggregation; the first selection module 34 is connected with the determination module 32 for selecting a first carrier resource from the reserved resources according to the capability of the UT; the second selection module 36 is connected with the determination module 32 for selecting, for the UT, a second carrier resource for bearing data from the resources except the reserved resources; and the aggregation module 38 is connected with the first selection module 34 and the second selection module 36 for aggregating the first carrier resource selected by the first selection module 34 and the second carrier resource selected by the second selection module 36.

Figure 4:
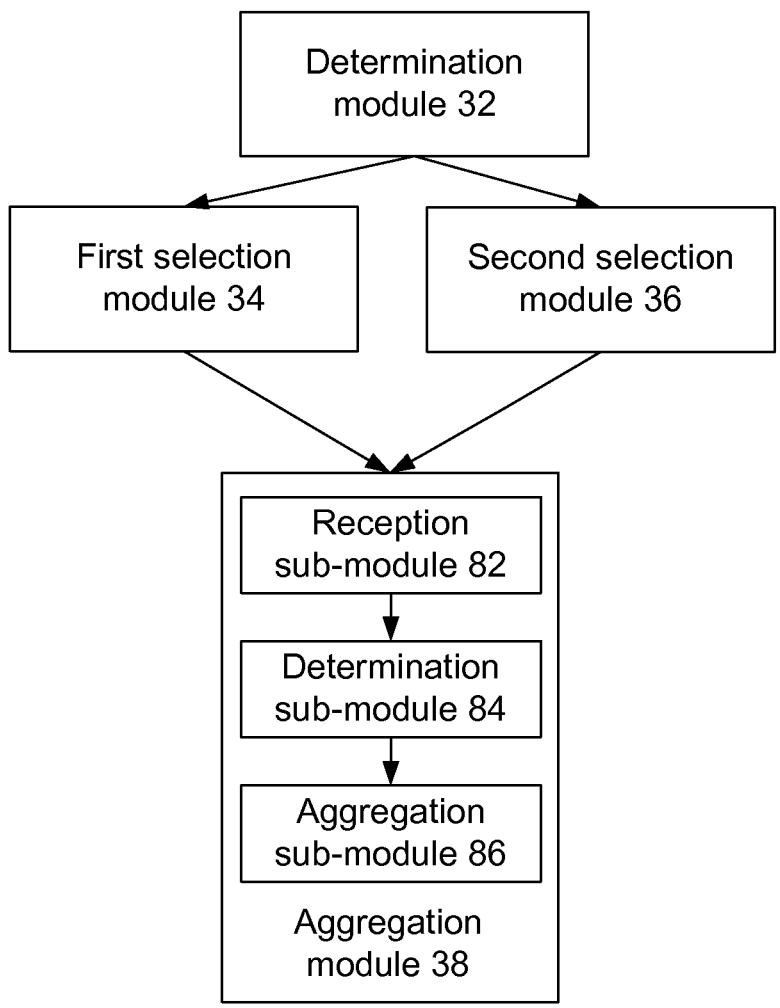
FIG. 4 is the structure diagram illustrating a base station according to a preferred embodiment of the present invention.

FIG. 4 is a structure diagram illustrating the BS according to a preferred embodiment of the present invention, as shown in FIG. 4, the aggregation module 38 comprises a reception sub-module 82, a determination sub-module 84 and an aggregation sub-module 86, each of which is described below:

the reception sub-module 82 is used for receiving a measurement result reported by the UT, wherein the measurement result is the result of a measurement of the UT on the interference of the first and second carrier resources selected by the BS; the determination sub-module 84 is connected with the reception sub-module 82 for determining, according to the measurement result of the reception sub-module 82, whether the interference of the UT meets the conditions for an inter-cell interference coordination in the system; and the aggregation sub-module 86 is connected with the determination sub-module 84 for aggregating the first and second carrier resources if the determination sub-module 84 determines that the interference of the user terminal meets the conditions for an inter-cell interference coordination in the system.

In accordance with this embodiment, by aggregating the first and second carrier resources after making a determination, the BS can increase, on the premise of reducing the inter-cell interference, the number of the carriers used by the UT to meet the various requirements of a new wireless communication network and guarantee the communication quality of the wireless communication network.

In conclusion, through the embodiments of the present invention, the important control channels born in the carrier aggregation and the carriers playing a big part in an important physical process such as random access are reserved, and synchronously the inter-cell interference coordination is taken into consideration to guarantee the orthogonalization of the carrier parts reserved in different neighboring BSs; besides, in order to use the reserved resources more flexible, the reserved carriers can be located at different carrier frequencies, moreover, the reserved resources can be correspondingly adjusted in position and dimension according to the requirements of the carrier aggregation, therefore, by aggregating the carriers resource-reserved by the BS and reserving the carrier parts playing a big part in the carrier aggregation; the present invention can increase the number of the carriers used by the UT on the premise of reducing the inter-cell interference to meet the various requirements of a new wireless communication network and guarantee the communication quality of the wireless communication network. Meanwhile, as the main control channels and the resources used in related physical processes are in the reserved part, the times of the blind detection of the UT during various physical processes, and the time taken by a signaling interaction and the energy consumption of the UT are reduced additionally.

Apparently, it should be understood by those skilled in this art that the modules or steps of the present invention can be realized by a universal computer, centralized on a single computer or distributed on a network consisting of multiple computers, and optionally realized by computer-executable program codes; the modules or steps can be therefore stored in a storage device to be executed by a computer or separately manufactured into integrated circuit modules, or some of the modules or steps are manufactured into a single integrated circuit module. Thus, the invention is not limited to any special combination of hardware and software.

The mentioned above is only preferred embodiments of the invention but not limitation for the invention, various modification and variations can be devised by those skilled in this art, and it should be understood that any modification, equivalent and improvement devised without departing from the spirit and scope of the invention belong to the protection scope of the invention.

The invention claimed is:

1. A method for implementing a carrier aggregation, comprising:
   determining predetermined information by a base station, wherein the predetermined information comprises reserved resources for the carrier aggregation and the capability of a user terminal;
   selecting a first carrier resource by the base station from the reserved resources according to the capability of the user terminal and selecting, for the user terminal, a second carrier resource for bearing data by the base station from the resources except the reserved resources; and
   aggregating the first and second carrier resources by the base station,
   wherein the step of aggregating the first and second carrier resources by the base station comprises:
   the base station receives a measurement result reported by the user terminal, wherein the measurement result is the result of a measurement of the user terminal on the interference of the first and second carrier resources selected by the base station;
   the base station determines, according to the measurement result, whether the interference of the user terminal meets the conditions for an inter-cell interference coordination in the system; and
   if the interference of the user terminal meets the conditions for an inter-cell interference coordination in the system, the base station aggregates the first and second carrier resources.

2. The method according to claim 1, wherein the step that the base station determines, according to the measurement result, whether the interference meets the conditions further comprises:
   if the result of the determination is that the interference of the user terminal fails to meet the conditions for an inter-cell interference coordination in the system, the base station takes the second carrier resource and the reserved resources as new reserved resources and reselects a first carrier resource from the new reserved resources.

3. The method according to claim 2, wherein after the base station aggregates the carrier resources and the other carrier resources, the method further comprising:

the base station reselects a first carrier resource when the interference caused by the use of a new carrier resulting from the aggregation by the user terminal fails to meet the conditions.

4. The method according to claim 2, wherein the first carrier resource is used for bearing control signaling and a physical process of the user terminal.

5. The method according to claim 1, wherein the predetermined information determined by the base station further comprises: the dimensions of the carriers participating in the carrier aggregation, and the dimensions are determined by the base station according to the bandwidth types supported by all the user terminal.

6. The method according to claim 5, wherein after the base station aggregates the carrier resources and the other carrier resources, the method further comprising:
the base station reselects a first carrier resource when the interference caused by the use of a new carrier resulting from the aggregation by the user terminal fails to meet the conditions.

7. The method according to claim 5, wherein the first carrier resource is used for bearing control signaling and a physical process of the user terminal.

8. The method according to claim 1, wherein the base station determines the reserved resources according to at least one of the factors:
load condition of the current system, the capability of the user terminal and/or the change thereof, the bandwidth types supported by all the user terminal, and condition of the inter-cell interference.

9. The method according to claim 8, wherein after the base station aggregates the carrier resources and the other carrier resources, the method further comprising:
the base station reselects a first carrier resource when the interference caused by the use of a new carrier resulting from the aggregation by the user terminal fails to meet the conditions.

10. The method according to claim 8, wherein the first carrier resource is used for bearing control signaling and a physical process of the user terminal.

11. The method according to claim 1, wherein in neighboring cells, all the reserved resources determined by the base station for the carrier aggregation are orthogonal resources.

12. The method according to claim 11, wherein after the base station aggregates the carrier resources and the other carrier resources, the method further comprising:
the base station reselects a first carrier resource when the interference caused by the use of a new carrier resulting from the aggregation by the user terminal fails to meet the conditions.

13. The method according to claim 11, wherein the first carrier resource is used for bearing control signaling and a physical process of the user terminal.

14. The method according to claim 1, wherein the capability of the user terminal determined by the base station comprises:
a bandwidth capability of the user terminal, the number of the aggregation-affecting carriers and the dimensions of the aggregation-affecting carriers.

15. The method according to claim 14, wherein after the base station aggregates the carrier resources and the other carrier resources, the method further comprising:
the base station reselects a first carrier resource when the interference caused by the use of a new carrier resulting from the aggregation by the user terminal fails to meet the conditions.

16. The method according to claim 14, wherein the first carrier resource is used for bearing control signaling and a physical process of the user terminal.

17. The method according to claim 1, wherein after the base station aggregates the carrier resources and the other carrier resources, the method further comprising:
the base station reselects a first carrier resource when the interference caused by the use of a new carrier resulting from the aggregation by the user terminal fails to meet the conditions.

18. The method according to claim 1, wherein the first carrier resource is used for bearing control signaling and a physical process of the user terminal.

19. A base station, comprising:
a determination module for determining predetermined information, wherein the predetermined information comprises reserved resources for a carrier aggregation and the capability of a user terminal;
a first selection module for selecting a first carrier resource from the reserved resources according to the capability of the user terminal;
a second selection module for selecting, for the user terminal, a second carrier resource for bearing data from the resources except the reserved resources; and
an aggregation module for aggregating the first carrier resource selected by the first selection module and the second carrier resource selected by the second selection module,
wherein the aggregation module comprises:
a reception sub-module for receiving a measurement result reported by the user terminal, wherein the measurement result is the result of a measurement of the user terminal on the interference of the first and second carrier resources selected by the base station;
a determination sub-module for determining, according to the measurement result received by the reception sub-module, whether the interference of the user terminal meets the conditions for an inter-cell interference coordination in the system; and
an aggregation sub-module for aggregating the first and second carrier resources when the determination sub-module determines that the interference of the user terminal meets the conditions for an inter-cell interference coordination in the system.

* * * * *